Figure 1:
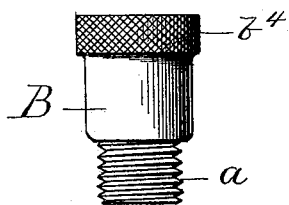

(No Model.)

A. LEVEDAHL.
OIL CUP.

No. 594,544.　　　　　　　　Patented Nov. 30, 1897.

Witnesses
L. Clinton Hamlink
Harold G. Barrett

Inventor
Axel Levedahl
by: Poole & Brown
his Attorneys

UNITED STATES PATENT OFFICE.

AXEL LEVEDAHL, OF AURORA, ILLINOIS, ASSIGNOR TO THE AURORA AUTOMATIC MACHINERY COMPANY, OF SAME PLACE.

OIL-CUP.

SPECIFICATION forming part of Letters Patent No. 594,544, dated November 30, 1897.

Application filed July 30, 1896. Serial No. 601,076. (No model.)

*To all whom it may concern:*

Be it known that I, AXEL LEVEDAHL, of Aurora, in the county of Kane and State of Illinois, have invented certain new and useful Improvements in Oil-Cups; and I do hereby declare that the following is a full, clear, and exact description thereof, reference being had to the accompanying drawings, and to the letters of reference marked thereon, which form a part of this specification.

This invention relates to improvements in oil-cups, the object being to produce an oil-cup that may be readily secured to and removed from the journal or other part to which the lubricant is to be supplied, and which shall have a cap member so arranged as to close the opening into which the lubricant is to be poured, but which member may be turned, when desired, so as to expose said opening.

Another object is to produce a neat and serviceable device, easy of manufacture, and one which is not liable to get out of order.

To these objects the invention consists in the devices and combination of devices illustrated in the drawings, set forth in the specification, and described in the subjoined claims.

Figure 2:
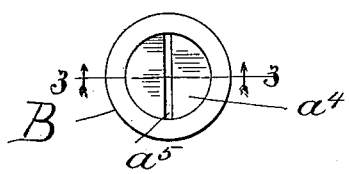
Figure 3:
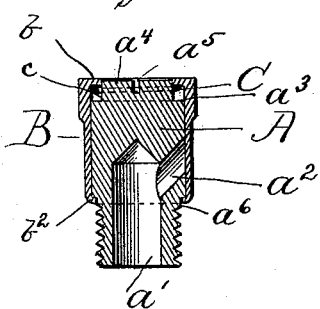
Figure 4:
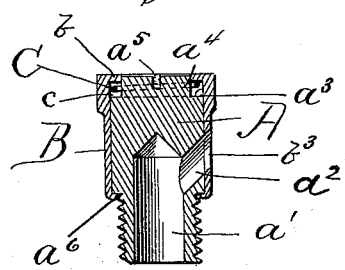
Figure 5:
Figure 6:
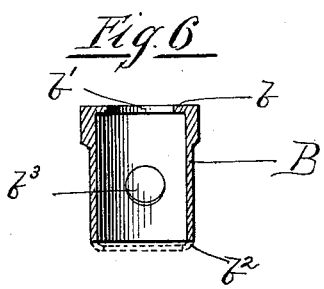

In the drawings, Figure 1 represents a side view of a device embodying my invention. Fig. 2 is a plan view of the same. Figs. 3 and 4 are vertical sectional views taken upon the line 3 3 of Fig. 2, looking in the direction indicated by the arrow, Fig. 3 showing the aperture for the lubricant closed and Fig. 4 showing it open. Fig. 5 is a detached view of the spring employed between the two members of my device; and Fig. 6 is a vertical sectional view of the outer or cap member, showing in dotted lines its lower margin inturned.

My improved oil-cup comprises three parts or members—to wit, an inner cylindric member A, an outer or cap member B, and a spring C. The inner or cylindric member A is provided in its lower portion with means for being secured to its seat, the same in this instance being shown as consisting of screw-threads $a$, placed exteriorly upon said lower portion and adapted to engage similar screw-threads interiorly arranged in a suitable aperture in the journal-bearings or other part constituting the seat for the oil-cup. Other means of securing the oil-cup to the seat may obviously be employed, if desired. Extending upwardly from the lower end of the cylindric member A is a longitudinally-arranged aperture $a'$, from the upper portion of which an upwardly or radially directed aperture $a^2$ extends through the side member A.

The upper portion of the member A is cut away at its margin, as shown, to form an annular shoulder $a^3$, the central portion proper, $a^4$, being therefore of less diameter than the diameter of the cylindric member A'. A groove $a^5$ is cut into the central portion $a^4$ of sufficient depth and width to form a slot or opening for the end of an ordinary screwdriver, by the use of which latter the said cylindric member A may be secured in its seat and also removed therefrom, as desired.

The outer or cap member B is a hollow cylinder provided with an inturned flange $b$ at its top and having a central aperture $b'$ at its top, through which the slotted head portion $a^4$ of the inner member may be reached when the two parts are in operative position. The interior diameter of the cap member B is substantially the same as the exterior diameter of the inner member A, whereby when the cap member A is placed over the inner member B the former may be moved freely about the latter, although a snug fit. After the cap member is placed in position upon the inner member A its lower margin is spun or inturned slightly, as shown by dotted lines in Fig. 6, to form a shoulder or flange $b^2$, that will engage a shoulder $a^6$ upon the inner member A, whereby it will be manifest that the longitudinal movement of the two parts A and B in one direction will be limited by the contact of the flange or shoulder $b^2$ with the shoulder $a^6$.

The inturned flange $b$ at the top of the cap member forms, as will be noticed from an inspection of Figs. 3 and 4, a cover or protection in the annular space $c$, formed by cutting away the upper edge or margin of the inner member A. Within this space $c$, surrounding the slotted extension $a^4$ and located between the shoulder $a^3$ and the under side of the flange $b$, is a spiral spring C of such number of turns as may be found advisable to employ, and which spring will be positioned so as to bear in part upon the under surface of the flange $b$ and upon the shoulder $a^3$ and thus hold the cap member B in position upon the inner member A with the inturned shoulder $b^2$ in contact or engagement with the shoulder $a^6$.

$b^3$ is an aperture extending through the side wall of the cap member B and adapted to register with the outer end of the journal or passage-way $a^2$. The upper exterior portion of the cap member B is preferably thickened slightly and milled, as shown at $b^4$, for more convenient handling, as well as to present a more pleasing appearance.

After the inner member A has been secured to its seat and the aperture $b^3$ arranged to register with the passage-way $a^2$, as shown in Fig. 4, a suitable lubricant may be inserted into the central space $a'$. As soon as the desired quantity of lubricating material has thus been supplied the outer or cap member B may be rotated by hand until the aperture $b^3$ has been moved past the outer edge of the passage-way $a^2$, thus closing the latter, as shown in Fig. 3. In this position no opening is left as a receptacle for gritty substances or the accumulation of dust, which otherwise would be liable to be wedged into the bearings. When it is desired to supply a lubricant to the bearing, the outer member B is rotated freely about the inner member $b$ until, as stated, the parts are in the position shown in Fig. 4. It will be found in practice that the spring C exerts a desired pressure to maintain the parts in proper position, into which they are moved by hand, and has sufficient tension to prevent the parts from being accidentally misplaced or the outer or cap member B shifted. The device thus becomes an air-tight oil-cup adapted to any locality or portion of the machine, one which is easily opened for the introduction of a lubricant, one which has no detachable parts that may be lost or which would be liable to get out of order, and one which has no place upon it for the accumulation of dust or gritty substances.

I am aware that oil-cups consisting of two principal parts fitting one within the other, the outer or cap member being provided with a solid head at one end, have heretofore been made and used and that the head of the inner member has been suitably slotted or provided with the transverse cut, forming a seat for the end of a screw-driver by which it may be secured in position. With all such constructions, however, it has been necessary first to remove the outer or cap member entirely from the inner member before the latter could be removed from its seat. With my invention it will be observed that the means for securing the oil-cup device as a whole to its seat or bearing is always accessible, and hence the entire device may be removed without dismembering it. This construction therefore is found to be of the most practical advantage in this respect.

What I claim, and desire to secure by Letters Patent, is as follows:

1. An oil-cup comprising a cylindric body portion and a sleeve movably mounted thereon each part having an opening through its sides, the opening in the sleeve registering with the opening in the body portion when the former is rotated upon the latter, a shoulder adjacent to the inner end of the body portion, an inturned flange on the sleeve adapted to engage said shoulder and prevent the sleeve from bodily outward movement, a shoulder adjacent to the outer end of the body portion forming with the sleeve an annular space between them, an inwardly-extending flange or annular shoulder upon the outer end of the sleeve located at a point above the face of the outer shoulder of the body portion, and a spring interposed in said space between the sleeve-shoulder and the body-portion shoulder and acting to exert a pressure lengthwise of the sleeve.

2. An oil-cup comprising a cylindric body portion, a sleeve mounted to turn thereon, a shoulder adjacent the inner end of the body portion, a flange on the sleeve adapted to engage said shoulder, an annular shoulder on the outer end of the body portion, an inwardly-extending flange on the sleeve adjacent to said annular shoulder and a spiral spring interposed between said last-mentioned flange and said annular shoulder in contact with the said shoulder and flange in order to exert a pressure longitudinally of the sleeve and to force the flange on the opposite end of the sleeve against the adjacent shoulder to thereby augment the frictional contact between the said parts.

3. An oil-cup comprising a cylindric body portion, a sleeve mounted to turn thereon, each member having an opening through its side, said openings being arranged to register when the sleeve is rotated upon the body portion, an annular shoulder adjacent the inner end of the body portion, a flange on the sleeve adapted to engage said annular shoulder and a spring interposed between the shoulder on the outer end of the body portion and the outer flange of the sleeve, and acting to exert a pressure lengthwise thereof, said sleeve being so constructed as to expose the outer end of the body portion so that it may be engaged by a suitable tool.

In testimony that I claim the foregoing as my invention I affix my signature, in presence of two witnesses, this 21st day of July, A. D. 1896.

AXEL LEVEDAHL.

Witnesses:
M. J. HURTNEY,
CHARLES E. ERIKSEN.